United States Patent
Singh et al.

(10) Patent No.: US 10,708,206 B2
(45) Date of Patent: Jul. 7, 2020

(54) MAILBOX PROTECTION IN WEB CONFERENCING SYSTEMS

(71) Applicant: Microsoft Technology Licensing, LLC, Redmond, WA (US)

(72) Inventors: Jaskaran Singh, Redmond, WA (US); Jaya Matthew, Seattle, WA (US); Hemant Sharma, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 259 days.

(21) Appl. No.: 15/839,711

(22) Filed: Dec. 12, 2017

(65) Prior Publication Data
US 2019/0182063 A1 Jun. 13, 2019

(51) Int. Cl.
*H04L 12/58* (2006.01)
*H04L 12/18* (2006.01)
(Continued)

(52) U.S. Cl.
CPC ....... *H04L 51/12* (2013.01); *G06Q 10/06315* (2013.01); *G06Q 10/107* (2013.01); *G06Q 10/109* (2013.01); *G06Q 10/1095* (2013.01); *H04L 12/1818* (2013.01); *H04L 12/1827* (2013.01); *H04L 51/00* (2013.01);
(Continued)

(58) Field of Classification Search
CPC ....... H04L 51/12; H04L 51/24; H04L 51/046; H04L 51/00; H04L 12/1827; H04L 51/22; H04L 12/1818; G06Q 10/1095; G06Q 10/109; G06Q 10/107; G06Q 10/06315
See application file for complete search history.

(56) References Cited

U.S. PATENT DOCUMENTS 7,505,571 B2 * 3/2009 Bhatia .................... H04L 51/36
379/88.14
7,707,256 B2 4/2010 Rollin et al.
(Continued)

FOREIGN PATENT DOCUMENTS

WO 2016144987 A1 9/2016

OTHER PUBLICATIONS

"International Search Report and Written Opinion Issued in PCT Application No. PCT/US2018/062155", dated Feb. 22, 2019, 11 Pages.
(Continued)

*Primary Examiner* — Ramy M Osman
(74) *Attorney, Agent, or Firm* — Liang IP, PLLC (57) ABSTRACT

Techniques for protecting mailboxes in computer-implemented conferencing systems are disclosed herein. In one embodiment, a method includes caching availability data representing availability information of meeting participants in a mailbox corresponding to a meeting organizer. The method also includes monitoring a mailbox size of the mailbox corresponding to the meeting organizer and determining whether the monitored mailbox size exceeds a preset threshold. The method further includes in response to determining that the monitored mailbox size exceeds the preset threshold, ceasing to cache additional availability data representing new availability information of the meeting participants received at the mailbox in order to prevent performance degradation of accessing the mailbox by the meeting organizer via the computer network.

20 Claims, 7 Drawing Sheets

(51) Int. Cl.
*G06Q 10/06* (2012.01)
*G06Q 10/10* (2012.01)

(52) U.S. Cl.
CPC ............ *H04L 51/046* (2013.01); *H04L 51/22* (2013.01); *H04L 51/24* (2013.01)

(56) References Cited

U.S. PATENT DOCUMENTS

| | | | |
|---|---|---|---|
| 7,849,102 B2 | 12/2010 | Murillo et al. | |
| 8,176,086 B2 | 5/2012 | John et al. | |
| 8,781,081 B2 | 7/2014 | Walter | |
| 8,862,666 B2 | 10/2014 | Digate et al. | |
| 8,880,614 B1* | 11/2014 | Greenberg | H04L 51/12 455/466 |
| 9,131,397 B2 | 9/2015 | Luna et al. | |
| 9,813,528 B2* | 11/2017 | Pal | H04L 67/2804 |
| 2002/0138326 A1* | 9/2002 | Parker | G06Q 10/109 705/50 |
| 2008/0084977 A1* | 4/2008 | Nayak | H04M 15/00 379/130 |
| 2008/0091500 A1* | 4/2008 | Barber-Mingo | G06Q 10/109 705/7.19 |
| 2008/0098071 A1* | 4/2008 | Jones | H04L 51/12 709/206 |
| 2008/0147469 A1* | 6/2008 | Murillo | G06Q 10/1095 705/7.19 |
| 2008/0214161 A1 | 9/2008 | Jakl | |
| 2008/0288598 A1* | 11/2008 | French | G06Q 10/107 709/206 |
| 2009/0043627 A1 | 2/2009 | Vaidya et al. | |
| 2012/0131108 A1* | 5/2012 | Barsness | G06Q 10/107 709/206 |
| 2012/0315932 A1* | 12/2012 | Spann | G06Q 10/10 455/466 |
| 2013/0238721 A1* | 9/2013 | Patel | H04L 51/12 709/206 |
| 2014/0046805 A1* | 2/2014 | Hu | H04L 51/02 705/26.81 |
| 2015/0381533 A1* | 12/2015 | Klemm | H04L 51/02 709/206 |
| 2016/0042324 A1* | 2/2016 | Johnson | H04L 51/046 705/7.19 |
| 2016/0350719 A1* | 12/2016 | Wang | G06Q 10/1095 |
| 2017/0017971 A1* | 1/2017 | Moreau | G06Q 30/0202 |
| 2018/0268349 A1* | 9/2018 | Martinson | G06Q 10/1093 |
| 2018/0375814 A1* | 12/2018 | Hart | H04L 51/22 |
| 2019/0182063 A1* | 6/2019 | Singh | H04L 51/22 |

OTHER PUBLICATIONS

Korjus, Olli, "Meeting Scheduling Assistant: Automatic scheduling between heterogeneous calendar systems", In Master's Thesis of Aalto University, Sep. 27, 2012, pp. 1-115.

* cited by examiner

MAILBOX PROTECTION IN WEB CONFERENCING SYSTEMS

BACKGROUND

Web conferencing generally refers to various types of network-based online collaborative services such as web seminars, webcasts, and peer-level online meetings. For example, web conferencing services allow real-time point-to-point communications between two meeting participants as well as multicast communications from one presenter to a general audience. Web conferencing can offer data streams of text-based messages, voice, and video to be shared across geographically dispersed locations.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Certain conferencing systems can merge with or configured to include email, calendar, messaging, or other suitable types of office productivity applications deployed in an organization. For example, a conferencing system can be integrated with electronic mailbox and calendar services. As such, a meeting organizer can schedule meetings with other meeting participants by transmitting meeting requests/responses via emails as well as automatically creating calendar items for the meeting in respective calendars. In certain implementations, the conferencing system can also collect availability data ("availability data") from the meeting participants and provide such availability data to the meeting organizer. Example availability data can include data representing that a meeting participant is currently online, online but away, busy, offline, in a meeting, etc. currently and/or in a future date/time. To facilitate ready access, the conferencing system can cache the collected availability data in, for example, the mailbox of the meeting organizer with corresponding time stamps.

Such caching operations, however, can create heavy workloads for a mailbox server hosting the mailbox of the meeting organizer and negatively affect performance of the mailbox server. For example, when the meeting involves hundreds or even thousands meeting participants, a data caching load on the mailbox server can be significantly large when the mailbox server periodically saves the collected availability data. Such large caching load can overwhelm the mailbox server to slow down or even prevent the meeting organizer from accessing the corresponding mailbox. In addition, a size of the mailbox of the meeting organizer can grow very large in order to contain the large amount of cached availability data. Such a large size can impair mailbox access as well as consume limited computing/storage resources at the mailbox server.

Several embodiments of the disclosed technology can address at least some aspects of the foregoing difficulties by implementing a mailbox protection scheme on the user mailboxes. In one implementation, the mailbox server can be configured to automatically attach a message to a meeting request from a meeting organizer to multiple meeting participants. The message can indicate to the mailbox servers of the meeting participants that availability data of the meeting participants should not be sent to the mailbox of the meeting organizer. In certain implementations, once the mailbox servers of the meeting participants receive the message, the mailbox servers can stop sending the availability data and relay the message to other users (e.g., those who are not in the meeting). As such, the conferencing system can create a list of mailboxes that are not interested in availability data.

In another implementation, the mailbox server can monitor a data size of the mailbox of the meeting organizer and determine whether to attach the message based on a preset threshold. For example, when the size of the mailbox of the meeting organizer is below the preset threshold, the mailbox server can transmit the meeting request without the message. Otherwise, the mailbox server can automatically attach the message to any new meeting requests from the meeting organizer. In yet other implementations, once determined that the size of the mailbox of the meeting organizer exceeds the threshold, the mailbox server can perform one or more of the following example operations:

- transmitting control flow messages to the other mailbox servers to cease providing availability data to the meeting organizer;
- placing a limit on a number of meeting participants whose availability data is to be cached, for example, based on an interaction level with the meeting organizer;
- placing a limit on a size of availability data to be cached; or
- deleting certain previously cached availability data from the meeting participants, for example, on a first-in-first-out basis or even completely delete all cached availability data.

In further implementations, when the size of the mailbox is below the threshold, the mailbox server can continue or restart the caching of availability data at the mailbox of the meeting organizer. In any of the foregoing implementations, the mailbox server can also monitor a number of caching operations, a number of meeting participants sending availability data, a computing load of the mailbox server, or other suitable parameters in addition to or in lieu of monitoring the size of the mailbox corresponding to the meeting organizer.

Several embodiments of the disclosed technology can thus protect user mailboxes from excessive caching of availability data. By monitoring a size of the mailbox and/or a load the caching operations related to the availability data on the mailbox server, the conference system can actively manage the amount of availability data received and/or cached in the mailbox of the meeting organizer. As such, when caching the availability data overburdens the mailbox server, the mailbox server can cause the other mailbox servers to cease providing such availability data, stop caching any received availability data, delete at least a portion of any already cached availability data, or perform other suitable remedial actions. As a result, a risk of performance degradation of accessing mailboxes at the mailbox by users can be reduced or even prevented.

DETAILED DESCRIPTION

Certain embodiments of computing systems, devices, components, modules, routines, and processes for mailbox protection in computer-implemented conferencing systems are described below. In the following description, specific details of components are included to provide a thorough understanding of certain embodiments of the disclosed technology. A person skilled in the relevant art can also understand that the disclosed technology may have additional embodiments or may be practiced without several of the details of the embodiments described below with reference to FIGS. 1A-4.

As used herein, the term "conferencing system" or "web conferencing system" generally refers to computer systems configured to provide various types of network-based online collaborative services, such as web seminars, webcasts, or peer-level online meetings. For example, conferencing systems can be configured to allow real-time point-to-point communications between a pair of meeting participants as well as multicast communications from one presenter/meeting organizer to many receivers/meeting participants. As such, conferencing systems can provide data streams of text-based messages, voice, and video to be shared simultaneously and across geographically dispersed locations via the Internet, a local area network, a wide area network, or other suitable types of computer network.

Also used herein, the term "mailbox" or "user mailbox" generally refers to a destination to which electronic mail messages or "emails" are delivered. A mailbox server can host a mailbox that is identified by an email address (e.g., "example.gmail.com"). The mailbox server can also provide a corresponding storage space with an allowed mailbox size (e.g., 2 gigabytes) either determined implicitly by available memory, or after quota definitions for that mailbox or folders thereof. The corresponding storage space of the mailbox can store emails or other related data using any suitable types of databases. Access to a mailbox is typically controlled by a mailbox provider (e.g., "Gmail").

Further used herein, "caching" generally refers to one or more computing operations of temporarily storing, in a memory space, data that is likely to be used again. For example, web browsers and web proxy servers employ web caches to store previous responses from web servers, such as web pages and images. Web caches can thus reduce an amount of information that needs to be transmitted across a computer network, as information previously stored in the web cache can often be re-used. Also used herein, "availability information" generally refers to information indicating a status of a user currently and/or in the future. For example, availability information can indicate whether a user is online, online but away, busy, in a meeting, offline, or other suitable types of status. In another example, availability information can also indicate whether a user has a meeting scheduled at a date/time in the future. Availability information can be generated by servers, operating systems on client devices, or other suitable components in a conferencing system to be shared with other users in the same conferencing system. Data representing availability information is referred to herein as "availability data."

In addition, the term "performance degradation" of a mailbox server generally refers to an increase of latency in accessing a mailbox on the mailbox server via a computer network, or a complete failure to access the mailbox. In certain situations, such a performance degradation can occur when a mailbox size of the mailbox exceeds a preset threshold. As such, the mailbox server needs to process a large amount of data (e.g., cached data representing availability information of other users) before providing a response (e.g., a new email) to a user. In other situations, such a performance degradation can also be caused by network congestion, mailbox server failure, or other suitable reasons.

In certain conferencing systems, mailbox servers can collect and periodically provide availability data from meeting participants to a meeting organizer once the conferencing systems detect that the meeting organizer has scheduled a meeting with the meeting participants. To facilitate ready access to the received availability data, the conferencing system can cache the received availability data in, for example, the mailbox of the meeting organizer. Such caching operations, however, can create heavy workload for the mailbox server and cause performance degradation of the mailbox server. For example, when the meeting involves hundreds or even thousands meeting participants, a load on the mailbox server for caching the availability data can be significantly large. Such large caching load can overwhelm the mailbox server to slow down or even prevent the meeting organizer from accessing the corresponding mailbox. In addition, a size of the mailbox of the meeting organizer can grow very large in order to contain the large amount of cached availability data. Such a large size can impair mailbox access as well as consuming precious computing/storage resources at the mailbox server.

Several embodiments of the disclosed technology can address at least some aspects of the foregoing difficulties by implementing a mailbox protection scheme on the mailboxes of users in a conferencing system. In one implementation, the mailbox server can be configured to continuously monitor a mailbox size of the mailbox of the meeting organizer. The mailbox server can also be configured to determine whether a current mailbox size exceeds a preset threshold. When the mailbox size exceeds the preset threshold, the mailbox server can cease caching any additional availability data, delete at least a portion of previously cached data, or perform other suitable remedial actions, as described in more detail below with reference to FIGS. 1A-4.

Figure 1A:
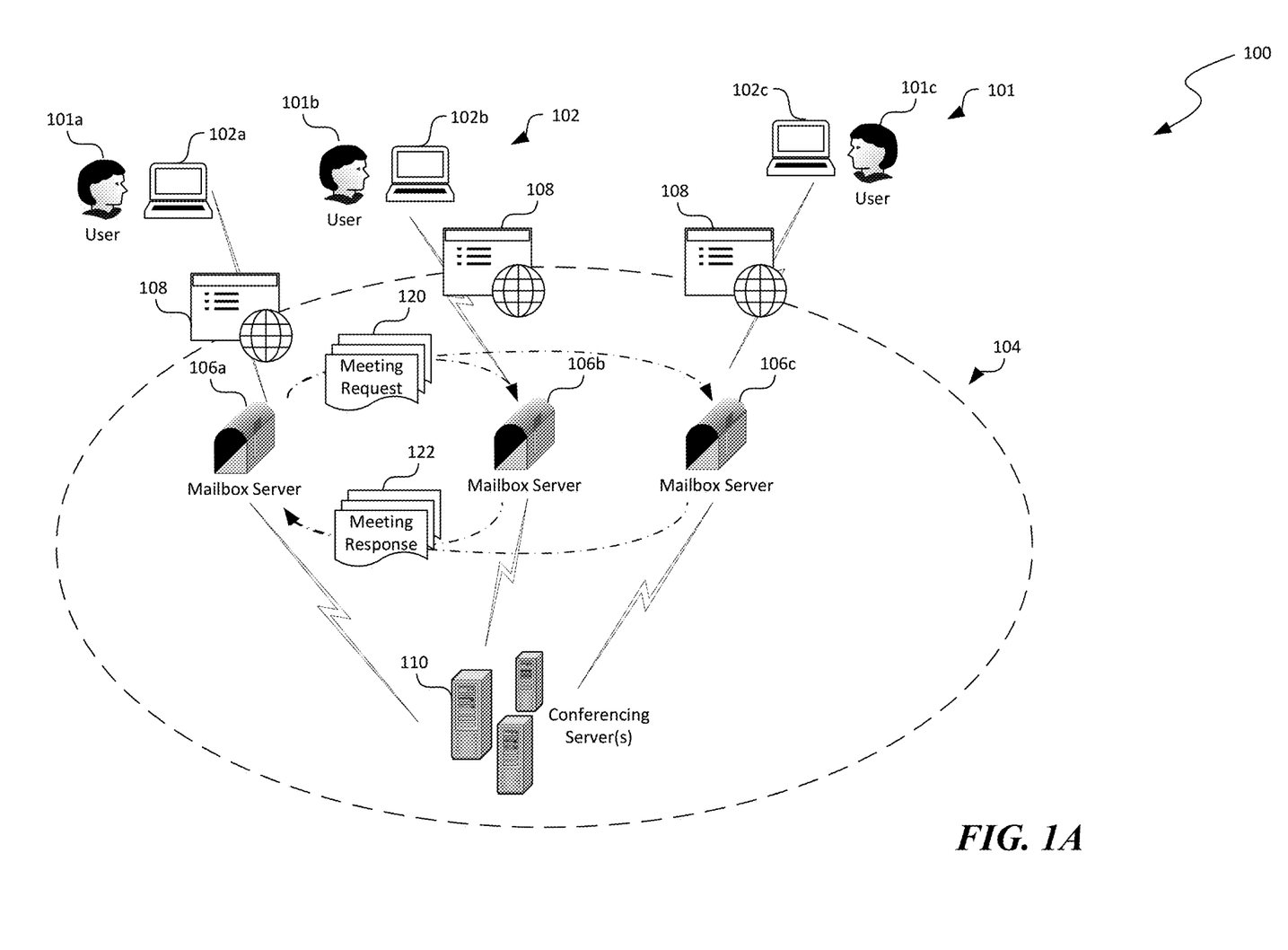
FIGS. 1A and 1B are schematic diagrams of a computer-implemented conferencing system configured for mailbox protection in accordance with embodiments of the disclosed technology.

FIG. 1A is a schematic diagram illustrating a computer-implemented conferencing system 100 configured for user mailbox protection in accordance with embodiments of the disclosed technology. As shown in FIG. 1A, the conferencing system 100 can include a computer network 104 (shown in phantom lines for clarity) interconnecting a plurality of client devices 102 (shown as first, second, and third client devices 102a-102c, respectively) of corresponding users 101 (shown as first, second, and third user 101a-101c, respectively), mailbox servers 106 (shown as first, second, and third mailbox servers 106a-106c, respectively), and one or more conferencing servers 110. The computer network 104 can include a local area network, a wide area network, the Internet, or other suitable types of computer network. Even though particular components are shown in FIG. 1A, in other embodiments, the conferencing system 100 can also include additional and/or different constituents. For example, the conferencing system 100 can include network storage devices, utility infrastructures, and/or other suitable components in addition to or in lieu of those shown in FIG. 1A.

The client devices 102 can each include a computing device that facilitates corresponding users 101 to access mailboxes 134 (shown in FIGS. 2A-2C) provided by the mailbox servers 106 via the computer network 104. For example, in the illustrated embodiment, the client devices 102 individually include a desktop computer. In other embodiments, the client devices 102 can also include laptop computers, tablet computers, smartphones, or other suitable computing devices. Even though three users 101 and corresponding mailbox servers 106 are shown in FIG. 1A for illustration purposes, in other embodiments, the conferencing system 100 can facilitate any suitable number of users 101 to access corresponding mailboxes 134 provided by the mailbox servers 106.

The conferencing servers 110 can include one or more servers or other suitable computing devices configured to facilitate real-time communications via, for instance, instant messaging, VoIP, ad hoc and structured conferences (audio, video, and/or web conferencing), public switched telephone network connectivity through a third-party gateway or Session Initiation Protocol ("SIP") trunk, or other suitable conferencing services. One example conferencing service is the Hangout Meet provided by Google, Inc. of Mountain View, Calif.

The mailbox servers 106 can be individually configured to host mailboxes 134 for the users 101. In FIG. 1A, the conferencing system 100 includes first, second, and third mailbox servers 106a-106c individually corresponding to the first, second, and third users 101a-101c. In other embodiments, one or more of the mailbox servers 106 can also host multiple mailboxes 134 for multiple users 101. Even though the mailbox servers 106 and the conferencing servers 110 are shown as separate components in the conferencing system 100, in other embodiments, at least some of the functionalities of the mailbox servers 106 can be incorporated into the conferencing servers 110, or vice versa.

As shown in FIG. 1A, the conferencing servers 110 and the mailbox servers 106 can cooperate to facilitate scheduling as well as conducting an online meeting among the users 101 via the computer network 104 via, for instance, corresponding user interfaces 108 (e.g., a conferencing portal). For example, the first user 101a can act as a meeting organizer and transmits meeting request 120 as emails to the mailbox servers 106 corresponding to the second and third users 101b and 101c. The meeting request 120 invites the second and third users 101b and 101c to participate, as meeting participants, in a meeting with the first user 101a. In response, the second and third users 101b and 101c can accept, reject, propose a new date/time, or perform other operations by transmitting a meeting response 122 back to the first mailbox server 106a of the first user 101a.

Figure 1B:
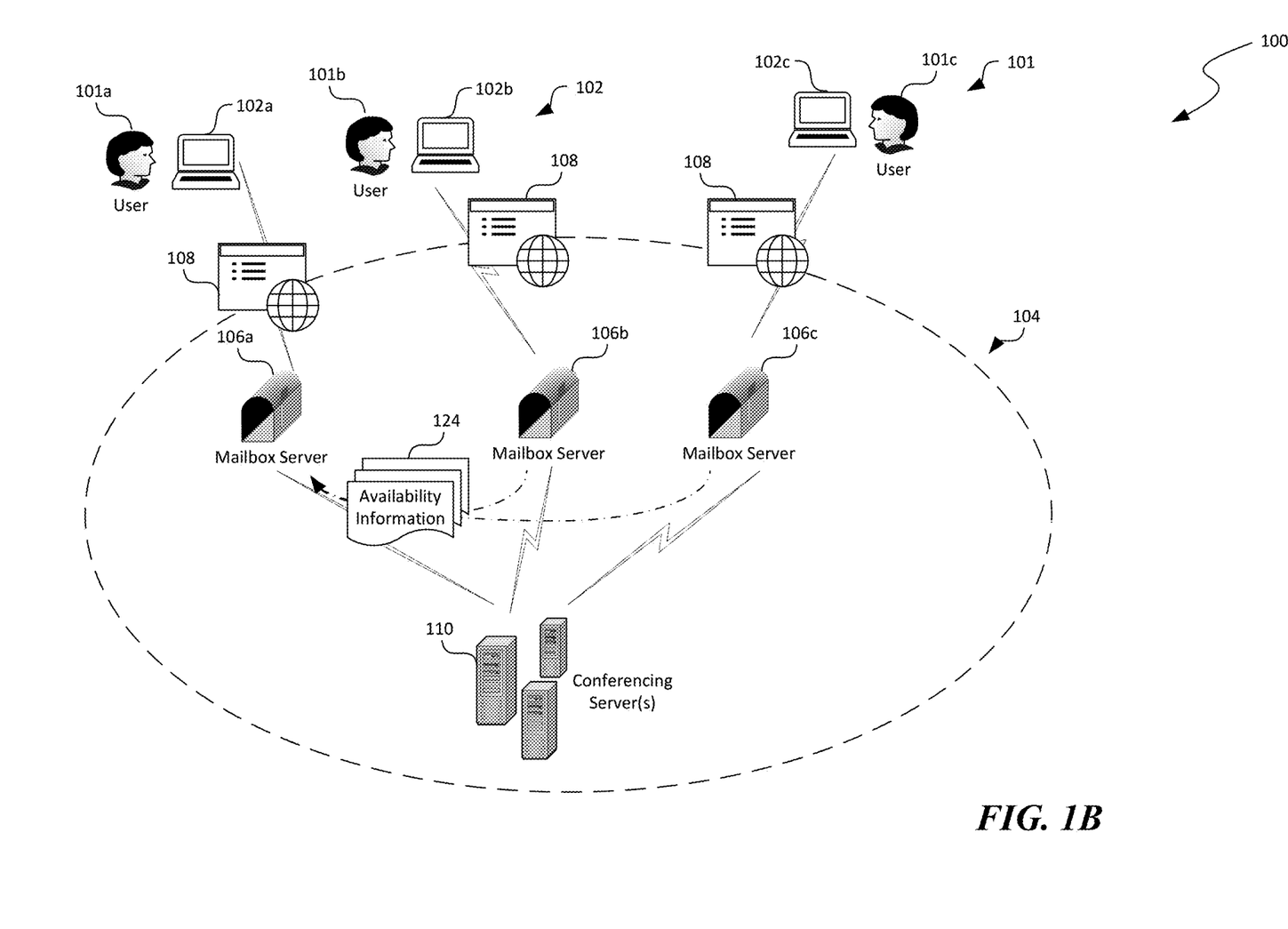

Once the requested meeting is scheduled, in certain implementations, the conferencing servers 110 can instruct the second and third mailbox servers 106b and 106c to collect and periodically provide availability data 124 of the second and third users 101b and 101c, as shown in FIG. 1B. To facilitate ready access of the received availability data 124, the first mailbox server 106a can be configured to cache the received data availability information 124, for example, in the mailbox 134 of the first user 101a. Such caching operations, however, can create heavy workload for the first mailbox server 106a and cause performance degradation of the mailbox server 106a. For example, when the meeting involves not just the second and third users 101b and 101c but instead hundreds or even thousands meeting participants, a load on the first mailbox server 106a for caching the availability data can be significantly large. Such large caching load can overwhelm the first mailbox server 106a to slow down or even prevent the first user 101a from accessing the corresponding mailbox 134. Several embodiments of the disclosed technology can address at least some aspects of the foregoing difficulties by implementing a mailbox protection scheme on the mailboxes 134 of users 101 such that a risk of performance degradation can be at least reduced if not eliminated, as described in more detail below with reference to FIGS. 2A-2C.

Figure 2A:
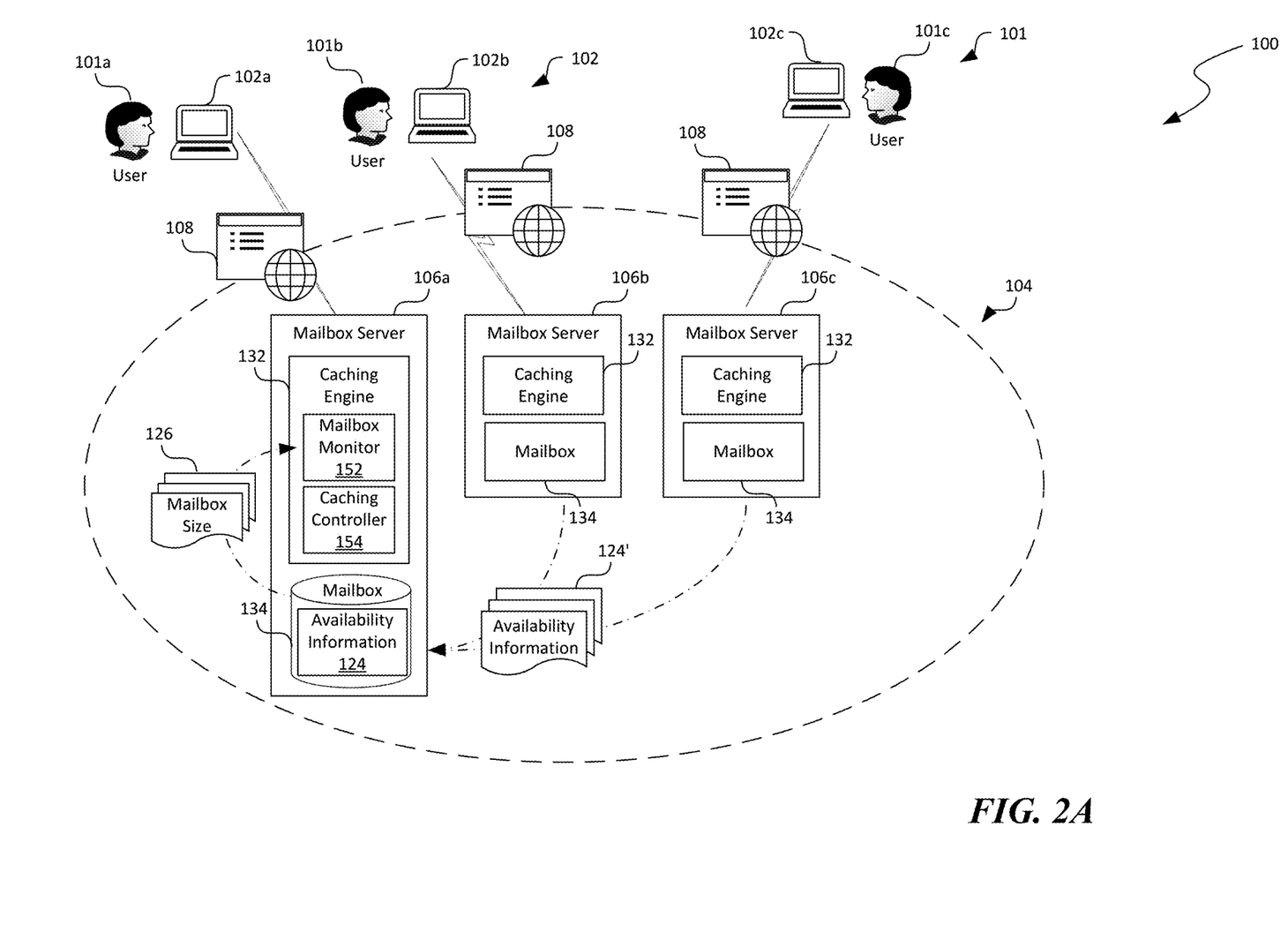
FIGS. 2A-2C are schematic diagrams illustrating certain hardware/software components of the conferencing system of FIGS. 1A and 1B in accordance with embodiments of the disclosed technology.
Figure 2B:
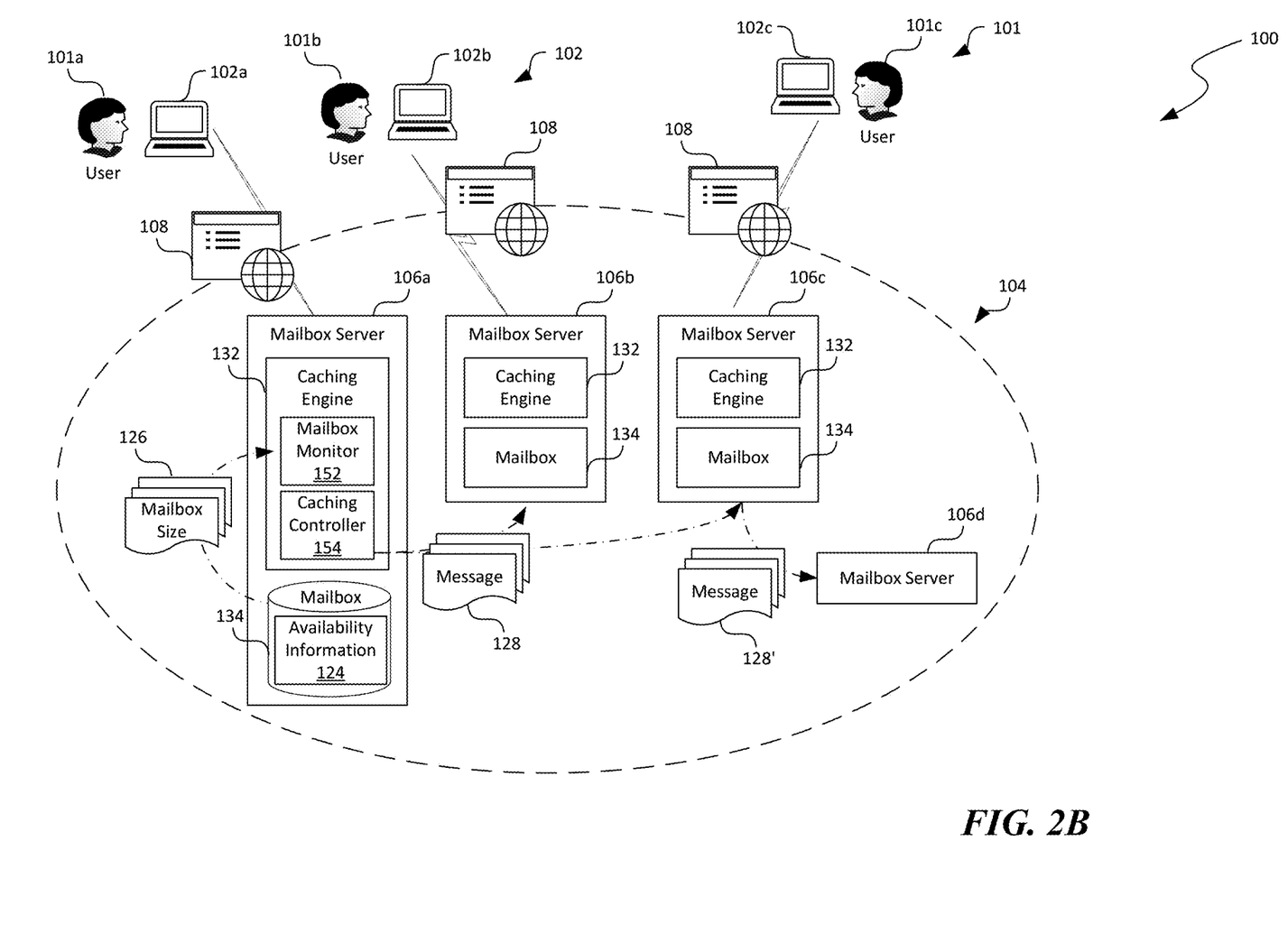
Figure 2C:
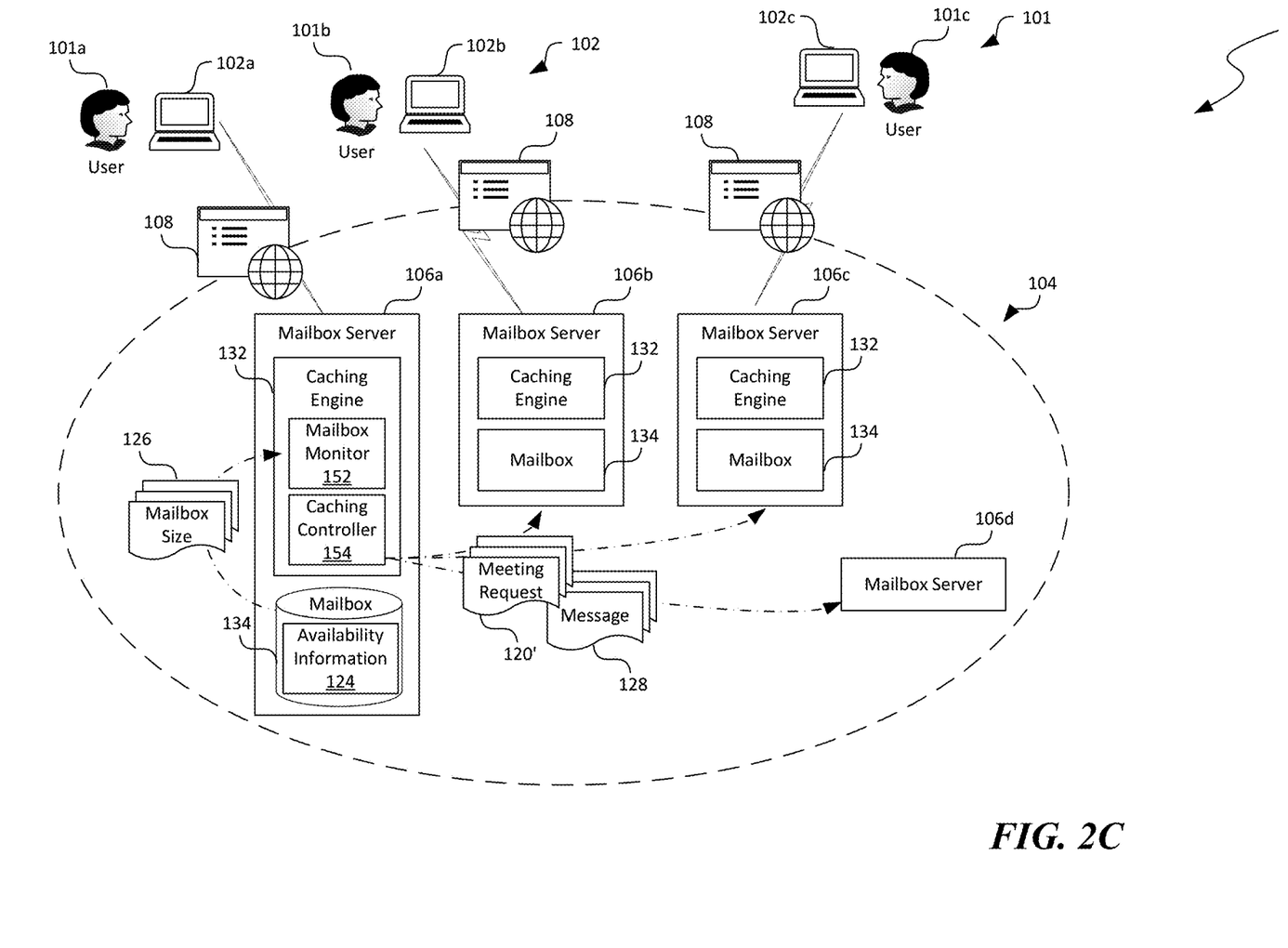

FIGS. 2A-2C are schematic diagrams illustrating certain hardware/software components of the conferencing system 100 of FIGS. 1A and 1B in accordance with embodiments of the disclosed technology. In FIGS. 2A-2C, only certain components of the conferencing system 100 of FIG. 1A are shown for clarity. For example, only the mailbox servers 106 are shown in FIGS. 2A-2C for illustration purposes. The conference servers 110 are not shown in FIGS. 2A-2C. Also, component details of only the first mailbox server 106a is shown in FIGS. 2A-2C for clarity. The second and/or third mailbox servers 106b and 106c can include similar or different components than the first mailbox server 106a.

In addition, in FIGS. 2A-2C and in other Figures herein, individual software components, objects, classes, modules, and routines may be a computer program, procedure, or process written as source code in C, C++, C #, Java, and/or other suitable programming languages. A component may include, without limitation, one or more modules, objects, classes, routines, properties, processes, threads, executables, libraries, or other components. Components may be in source or binary form. Components may include aspects of source code before compilation (e.g., classes, properties, procedures, routines), compiled binary units (e.g., libraries, executables), or artifacts instantiated and used at runtime (e.g., objects, processes, threads). In certain embodiments, the various components and modules described below can be implemented with actors. In other embodiments, generation of the application and/or related services can also be implemented using monolithic applications, multi-tiered applications, or other suitable components.

Components within a system can take different forms within the system. As one example, a system comprising a first component, a second component and a third component can, without limitation, encompass a system that has the first component being a property in source code, the second component being a binary compiled library, and the third component being a thread created at runtime. The computer program, procedure, or process may be compiled into object, intermediate, or machine code and presented for execution by one or more processors of a personal computer, a network server, a laptop computer, a smartphone, and/or other suitable computing devices. Equally, components may include hardware circuitry.

A person of ordinary skill in the art would recognize that hardware may be considered fossilized software, and software may be considered liquefied hardware. As just one example, software instructions in a component may be burned to a Programmable Logic Array circuit, or may be designed as a hardware circuit with appropriate integrated circuits. Equally, hardware may be emulated by software. Various implementations of source, intermediate, and/or object code and associated data may be stored in a computer memory that includes read-only memory, random-access memory, magnetic disk storage media, optical storage media, flash memory devices, and/or other suitable computer readable storage media excluding propagated signals.

As shown in FIG. 2A, the first mailbox server 106a can include a caching engine 132 operatively coupled to a mailbox 134 corresponding to the first user 101a. The mailbox 134 can be configured to contain email data of the first user 101a as well as availability data 124 of other users 101 received at the first mailbox server 106a. Even though only the foregoing components of the first mailbox server 106a are shown in FIGS. 2A-2C, in other embodiments, the first mailbox server 106a can also include interface components, network components, or other suitable components.

The caching engine 132 can be configured to monitor and control caching operations of the availability data 124 on the first mailbox server 106a. For example, as shown in FIG. 2A, in certain embodiments, the caching engine 132 can include a mailbox monitor 152 and a caching controller 154. In certain embodiments, the mailbox monitor 152 can be configured to continuously or periodically monitor a mailbox size 126 of the mailbox 134. In other embodiments, the mailbox monitor 152 can also be configured to monitor or determine a file size of the cached availability data 124 in the mailbox 134. In further embodiments, the mailbox monitor 152 can be configured to detect a performance level of the mailbox 134 in terms of, for instance, latency for responding to a request from the first user 101a or other suitable parameters in addition to or in lieu of the fore mailbox size 124 or the file size of the availability data 124.

Based on the determined one or more parameters of the mailbox 134, the caching controller 154 can be configured to determine whether to allow caching of the availability data 124 in the mailbox 134 on the first mailbox server 106a. For example, in the illustrated embodiment, the caching controller 154 can compare the mailbox size 126 to a preset threshold that is associated with performance degradation of accessing the mailbox 134 by the first user 101a via the computer network 104. The preset threshold may be set manually by an administrator (not shown) or set automatically based on historical performance data of the first mailbox server 106a. In response to determining that the monitored mailbox size 126 exceeds the preset threshold, in one embodiment, the caching controller 154 can cease to cache additional data representing availability information 124' of the other users 101 received at the mailbox 134 via the computer network 104.

In another embodiment, the caching controller 154 can also be configured to delete at least a portion of the previously cached availability data 124 in the mailbox 124, for example, on a first-in-first-out basis. Subsequent to deleting the at least a portion of the previously cached availability data 124, the caching controller 154 can allow continued caching of the additional data representing new availability information 124' of the other users 101, or re-evaluate the mailbox size 126 in light of the preset threshold. If the mailbox size 126 is now below the preset threshold, the caching controller 154 can allowing continued caching of the additional data representing availability information 124' of the other users 101. In other embodiments, the caching controller 154 can be configured to completely delete the previously cached availability data 124 in the mailbox 124.

In yet another embodiment, the caching controller 154 can also be configured to transmit messages 128 to the second and third mailbox servers 106b and 106c, as shown in FIG. 2B. The messages 128 can indicate to the second and third mailbox servers 106b and 106c that the mailbox 134 of the first user 101a no longer accepts any additional availability data 124' (FIG. 2A) of the second and third users 101b and 101c. As shown in FIG. 2B, in certain embodiments, the third mailbox server 106c can also be configured to forward a copy of the message 128' to additional mailbox servers 106 (e.g., shown in FIG. 2B as fourth mailbox server 106d) that are not in the meeting with the first user 101a. As such, the conferencing system 100 can create a list of mailboxes 134 that are not interested in availability data 124.

In a further embodiment, the caching controller 154 can be configured to restrict a number of the other users 101 whose availability information 124' is cached at the first mailbox server 101a based on interaction levels, relationships, or other suitable criteria. For example, the first mailbox server 106a can track a number of interactions (e.g., a number of emails) between the first user 101a and the second user 101b and between the first user 101a and the third user 101c. If the number of emails between the first and second users 101a and 101b is greater than that between the first and third users 101a and 101c, the caching controller 154 can cause the availability data 124' from only the second user 101b be cached but not that from the third user 101c. In further embodiments, the caching controller 154 can also be configured to apply such a restriction on a tiered basis. For instance, the availability data 124' from the second user 101b can be cached until the mailbox size 126 exceeds another preset threshold.

As shown in FIG. 2C, in further embodiments, in response to determining that the monitored mailbox size 126 exceeds the preset threshold, the caching controller 154 can also be configured to automatically attach a message 128 to additional meeting requests 120' by the first user 101a to additional users 101 (e.g., second, third, and fourth users 101b-101d in FIG. 2C). The message 128 can indicate to the additional mailbox servers 106 that the mailbox 134 of the first user 101a does not accept any data representing availability information 124 of the additional users 101. In yet further embodiments, the caching controller 154 can be configured to stop the automatic attaching of the message 128 when the mailbox size 126 falls below the present threshold.

In any of the foregoing embodiments described above with reference to FIGS. 2A-2C, the caching controller 154 can also be configured to receive, from the first user 101a, a configuration parameter indicating to the mailbox server 106a that no availability data 124 is to be cached in the mailbox 134. Based on the received configuration parameter, the caching controller 154 can automatically attach the message 128 to any meeting requests 120 by the first user 101a to the other users 101 in the conferencing system 100. In addition, the foregoing remedial actions for addressing excessive caching of the availability data 124 can also be conditioned on a latency of accessing the mailbox 134 by the first user 101a or other suitable performance parameters related to operations of the mailbox 134.

Figure 3A:
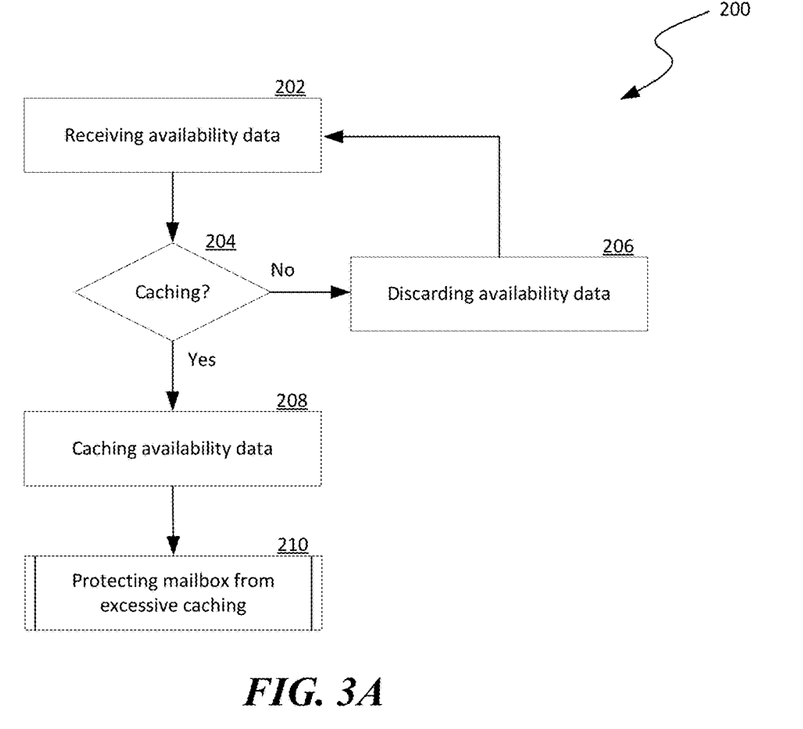
FIGS. 3A and 3B are flowcharts illustrating various processes of mailbox protection in a computer-implemented conferencing system in accordance with embodiments of the disclosed technology.
Figure 3B:
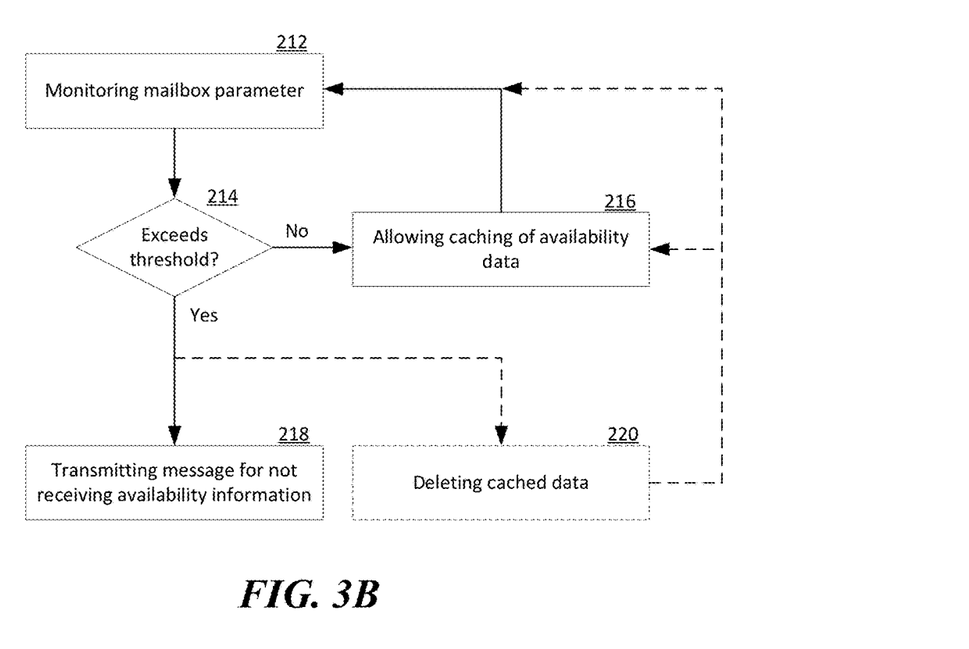

FIGS. 3A and 3B are flowcharts illustrating various processes of mailbox protection in a computer-implemented conferencing system in accordance with embodiments of the disclosed technology. Even though various embodiments of the processes are described below with reference to the conferencing system 100 of FIGS. 1A-2C, in other embodiments, the processes can also be implemented in conferencing systems with different components.

As shown in FIG. 3A, a process 200 can include receiving availability data, for example, at the mailbox 134 of the first user 101a in FIG. 2A, at stage 202. The process 200 can then include a decision stage 204 to determine whether caching of the received availability data is allowed. As discussed in more detail below with reference to FIG. 3B, the determination at stage 204 can be based on various suitable criteria, such as whether a mailbox size exceeds a preset threshold. In response to determining that caching of the received availability data is not allowed, the process 200 can include discarding the received availability data at stage 206 before reverting to receiving additional availability data at stage 202.

In response to determining that caching of the received availability data is allowed, the process 200 can include caching the received availability data in, for example, the mailbox 134 in FIG. 2A at stage 208 before proceeding to protecting the mailbox from excessive caching at stage 210. Example operations of protecting the mailbox from excessive caching are described in more detail below with reference to FIG. 3B.

As shown in FIG. 3B, the operations of protecting the mailbox from excessive caching of availability data can include monitoring a mailbox parameter at stage 212. In one embodiment, the mailbox parameter can include a mailbox size indicating an amount of data stored in the mailbox. In other embodiments, the mailbox parameter can include a latency of accessing the mailbox, an indication of mailbox unavailability, or other suitable parameters. The operations can then include a decision stage 214 to determine whether the mailbox parameter (e.g., the mailbox size) exceeds a preset threshold. In response to determining that the mailbox parameter (e.g., the mailbox size) does not exceed the preset threshold, the operations can include allowing continued caching of availability data at stage 216 before reverting to monitoring another mailbox parameter at stage 212.

In response to determining that the mailbox parameter (e.g., the mailbox size) exceeds the preset threshold, the operations can include transmitting a message to other mailbox servers indicating that no availability data is to be transmitted to the mailbox at stage 218. The operations can also set a flag to the decision stage 204 of FIG. 3A such that any additional availability data received at the mailbox would not be cached. As shown in FIG. 3B, the operations can also optionally include deleting at least a portion of previously cached availability data, for example, on a first-in-first-out basis, at stage 220. The operations can the revert to allowing continued caching of availability data at stage 216 or to monitoring another mailbox parameter at stage 212.

Figure 4:
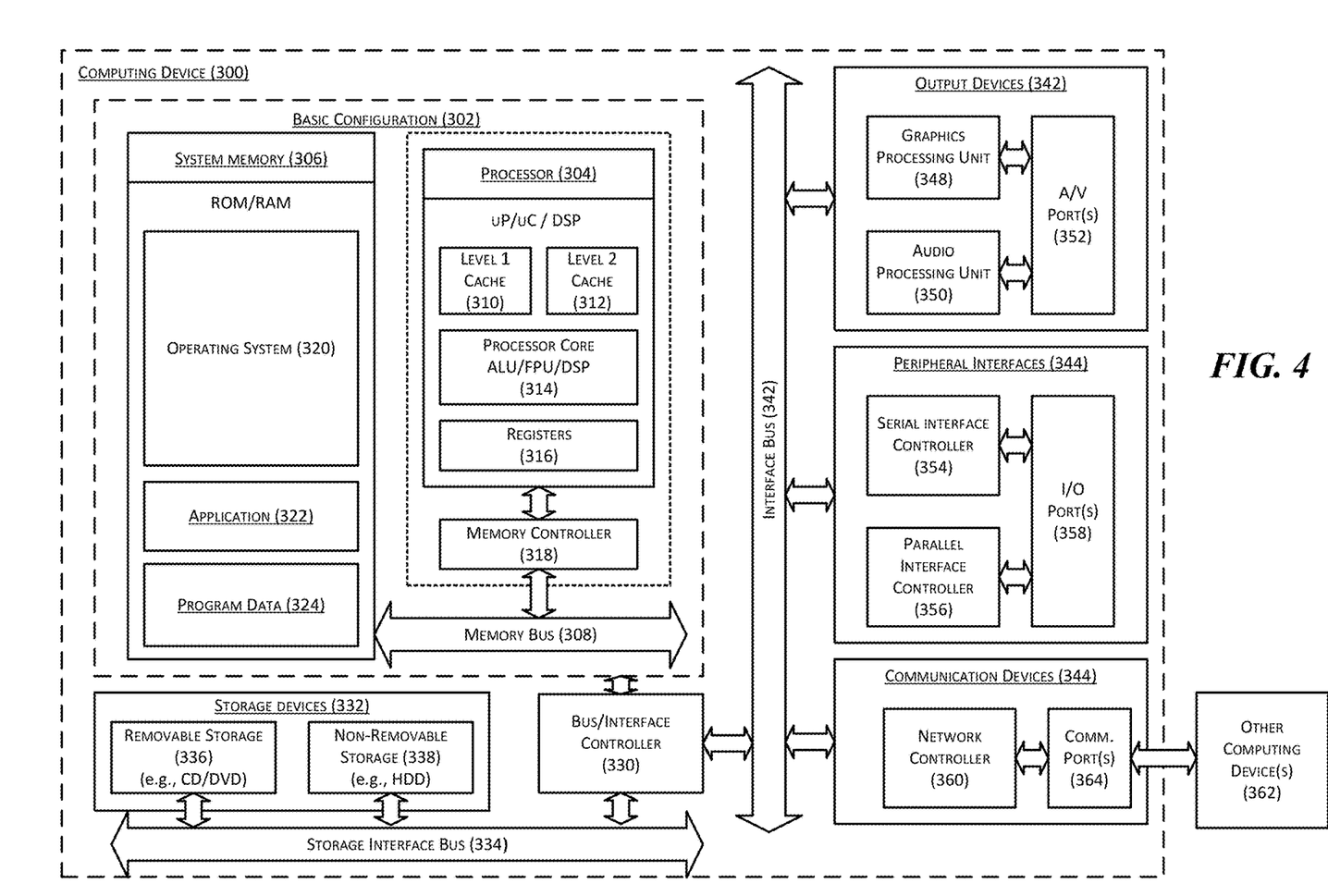
FIG. 4 is a computing device suitable for certain components of the conferencing system in FIG. 1.

FIG. 4 is a computing device 300 suitable for certain components of the conferencing system 100 in FIG. 1A. For example, the computing device 300 can be suitable for the client devices 102, the mailbox servers 106, or the conferencing servers 110 of FIG. 1A. In a very basic configuration 302, the computing device 300 can include one or more processors 304 and a system memory 306. A memory bus 308 can be used for communicating between processor 304 and system memory 306.

Depending on the desired configuration, the processor 304 can be of any type including but not limited to a microprocessor (µP), a microcontroller (µC), a digital signal processor (DSP), or any combination thereof. The processor 304 can include one more levels of caching, such as a level-one cache 310 and a level-two cache 312, a processor core 314, and registers 316. An example processor core 314 can include an arithmetic logic unit (ALU), a floating-point unit (FPU), a digital signal processing core (DSP Core), or any combination thereof. An example memory controller 318 can also be used with processor 304, or in some implementations, memory controller 318 can be an internal part of processor 304.

Depending on the desired configuration, the system memory 306 can be of any type including but not limited to volatile memory (such as RAM), non-volatile memory (such as ROM, flash memory, etc.) or any combination thereof. The system memory 306 can include an operating system 320, one or more applications 322, and program data 324. This described basic configuration 302 is illustrated in FIG. 4 by those components within the inner dashed line.

The computing device 300 can have additional features or functionality, and additional interfaces to facilitate communications between basic configuration 302 and any other devices and interfaces. For example, a bus/interface controller 330 can be used to facilitate communications between the basic configuration 302 and one or more data storage devices 332 via a storage interface bus 334. The data storage devices 332 can be removable storage devices 336, non-removable storage devices 338, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable and non-removable media implemented in any method or technology for storage of information, such as computer readable instructions, data structures, program modules, or other data. The term "computer readable storage media" or "computer readable storage device" excludes propagated signals and communication media.

The system memory 306, removable storage devices 336, and non-removable storage devices 338 are examples of computer readable storage media. Computer readable storage media include, but not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by computing device 300. Any such computer readable storage media can be a part of computing device 300. The term "computer readable storage medium" excludes propagated signals and communication media.

The computing device 300 can also include an interface bus 340 for facilitating communication from various interface devices (e.g., output devices 342, peripheral interfaces 344, and communication devices 346) to the basic configuration 302 via bus/interface controller 330. Example output devices 342 include a graphics processing unit 348 and an audio processing unit 350, which can be configured to communicate to various external devices such as a display or speakers via one or more A/V ports 352. Example peripheral interfaces 344 include a serial interface controller 354 or a parallel interface controller 356, which can be configured to communicate with external devices such as input devices (e.g., keyboard, mouse, pen, voice input device, touch input device, etc.) or other peripheral devices (e.g., printer, scanner, etc.) via one or more I/O ports 358. An example communication device 346 includes a network controller 360, which can be arranged to facilitate communications with one or more other computing devices 362 over a network communication link via one or more communication ports 364.

The network communication link can be one example of a communication media. Communication media can typically be embodied by computer readable instructions, data structures, program modules, or other data in a modulated data signal, such as a carrier wave or other transport mechanism, and can include any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), microwave, infrared (IR) and other wireless media. The term computer readable media as used herein can include both storage media and communication media.

The computing device 300 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. The computing device 300 can also be implemented as a personal computer including both laptop computer and non-laptop computer configurations.

From the foregoing, it will be appreciated that specific embodiments of the disclosure have been described herein for purposes of illustration, but that various modifications may be made without deviating from the disclosure. In addition, many of the elements of one embodiment may be combined with other embodiments in addition to or in lieu of the elements of the other embodiments. Accordingly, the technology is not limited except as by the appended claims.

We claim:

1. A method of protecting user mailboxes in a computer-implemented conferencing system having multiple mailbox servers interconnected by a computer network, the mailbox servers individually hosting one or more mailboxes corresponding to corresponding users, the method comprising:
   upon scheduling a meeting in the conferencing system by a user with the other users,
      caching availability data received via the computer network in a mailbox of the user hosted by a mailbox server, the cached availability data representing availability information of other users in the conferencing system;
      monitoring a mailbox size of the mailbox corresponding to the user on the mailbox server, the mailbox size indicating an amount of the cached availability data in the mailbox;
      determining whether the monitored mailbox size exceeds a preset threshold that is indicative of performance degradation of accessing the mailbox by the user via the computer network; and
   in response to determining that the monitored mailbox size exceeds the preset threshold, ceasing to cache additional availability data from the other users received at the mailbox via the computer network and transmitting a message to additional mailbox servers hosting the mailboxes of the other users, the message indicating to the additional mailbox servers that the mailbox of the user no longer accepts any additional availability data of the other users, thereby preventing performance degradation of accessing the mailbox hosted on the mailbox server by the user via the computer network.

2. The method of claim 1, further comprising allowing continued caching of the additional availability data from the other users received at the mailbox via the computer network in response to determining that the monitored mailbox size does not exceed the preset threshold.

3. The method of claim 1, further comprising, in response to determining that the monitored mailbox size exceeds the preset threshold, restricting a number of the other users whose availability data is cached at the mailbox server.

4. The method of claim 1, further comprising:
   in response to determining that the monitored mailbox size exceeds the preset threshold, automatically attaching a message to additional meeting requests by the user to additional users; and
   transmitting the additional meeting requests with the automatically attached message to additional mailbox servers hosting mailboxes of the additional users, the message indicating to the additional mailbox servers that the mailbox of the user does not accept any availability data from the additional users.

5. The method of claim 1, further comprising:
   in response to determining that the monitored mailbox size exceeds the preset threshold,
      deleting at least a portion of the cached availability data in the mailbox of the user hosted by the mailbox server; and
      subsequently, allowing continued caching of the additional availability data from the other users received at the mailbox via the computer network.

6. The method of claim 1, further comprising:
   in response to determining that the monitored mailbox size exceeds the preset threshold,
      deleting at least a portion of the cached data in the mailbox of the user hosted by the mailbox server;
      re-evaluating the mailbox size in light of the preset threshold subsequent to deleting the at least a portion of the cached data; and
      when the re-evaluated mailbox size is below the preset threshold, allowing continued caching of the additional availability data from the other users received at the mailbox via the computer network.

7. The method of claim 1 wherein:
   the method further includes, in response to determining that the monitored mailbox size exceeds the preset threshold,
      relaying, by the additional mailbox servers via the computer network, a copy of the message to further mailbox servers hosting mailboxes corresponding to further users not in the meeting with the user.

8. The method of claim 1, further comprising:
   receiving, from the user and via the computer network, a configuration parameter indicating to the mailbox server that no availability data is to be cached; and
   based on the received configuration parameter, automatically attaching a message to any meeting requests by the user to the other users in the conferencing system, the message indicating to additional mailbox servers hosting mailboxes of the other users that the mailbox of the user does not accept any availability data from the other users.

9. A mailbox server in a computer-implemented conferencing system having multiple additional mailbox servers interconnected to one another by a computer network, the mailbox server comprising:
   a processor; and
   a memory operatively coupled to the processor, the memory containing instructions executable by the processor to cause the mailbox server to:
      upon scheduling a meeting in the conferencing system by a user with the other users, receive, via the computer network, availability data representing availability information of the other users in the conferencing system;

cache the received availability data in a mailbox of the user hosted by the mailbox server, the user having scheduled the meeting in the conferencing system with the other users;

determine a mailbox size of the mailbox corresponding to the user on the mailbox server, the mailbox size indicating an amount of the cached availability data in the mailbox; and when the determined mailbox size exceeds a preset threshold, stop caching additional availability data from the other users received at the mailbox server of the user and transmitting a message to the additional mailbox servers hosting the mailboxes of the other users, the message indicating to the additional mailbox servers that the mailbox of the user no longer accepts any additional availability data from the additional mailbox servers, thereby preventing performance degradation of accessing the mailbox at the mailbox server by the user via the computer network.

10. The mailbox server of claim 9 wherein the memory containing additional instructions executable by the processor to cause the mailbox server to allow continued caching of the additional availability data from the other users when the monitored mailbox size does not exceed the preset threshold.

11. The mailbox server of claim 9 wherein the memory containing additional instructions executable by the processor to cause the mailbox server to allow caching availability data of only a number of the other users based on an interaction level between the user and the individual other users when the determined mailbox size exceeds the preset threshold.

12. The mailbox server of claim 9 wherein the memory containing additional instructions executable by the processor to cause the mailbox server to:

when the determined mailbox size exceeds the preset threshold,
delete at least a portion of the cached availability data in the mailbox of the user hosted by the mailbox server on a first-in-first-out basis; and
subsequently, allow continued caching of the additional availability data from the other users received at the mailbox via the computer network.

13. The mailbox server of claim 9 wherein the memory containing additional instructions executable by the processor to cause the mailbox server to:

when the determined mailbox size exceeds the preset threshold,
delete at least a portion of the cached availability data in the mailbox of the user hosted by the mailbox server on a first-in-first-out basis;
re-evaluate the mailbox size in light of the preset threshold subsequent to deleting the at least a portion of the cached availability data; and
when the re-evaluated mailbox size is below the preset threshold subsequent to deleting the at least a portion of the cached availability data in the mailbox of the user hosted by the mailbox server, allow continued caching of the additional availability data from the other users received at the mailbox via the computer network.

14. A method of protecting user mailboxes in a computer-implemented conferencing system having multiple mailbox servers interconnected by a computer network, the mailbox servers individually hosting one or more mailboxes corresponding to corresponding users, the method comprising:

upon scheduling a meeting in the conferencing system by a user with the other users,
determining an amount of cached availability data in a mailbox corresponding to the user and hosted on a mailbox server in the conferencing system, the cached availability data representing availability information of the other users in the conferencing system and periodically received at the mailbox server;
performing a comparison of the determined amount of cached availability data with a preset threshold indicative of potential performance degradation associated with accessing the mailbox at the mailbox server by the user via the computer network; and
based on the performed comparison, disallowing caching of any additional availability data representing additional availability information of the other users received at the mailbox via the computer network and transmitting a message to additional mailbox servers hosting the mailboxes of the other users, the message indicating to the additional mailbox servers that the mailbox of the user no longer accepts any additional availability data from the additional mailbox servers when the determined amount of cached availability data exceeds the preset threshold, thereby preventing the performance degradation of accessing the mailbox at the mailbox server by the user via the computer network.

15. The method of claim 14 wherein the availability information indicating the other individual users are online, online but away, busy, in a meeting, or offline.

16. The method of claim 14, further comprising allowing continued caching of the additional availability data representing additional availability information of the other users received at the mailbox via the computer network when the determined mailbox size does not exceed the preset threshold.

17. The method of claim 14, further comprising, when the determined mailbox size exceeds the preset threshold, performing:

deleting, at the mailbox server, at least a portion of the cached availability data in the mailbox corresponding to the user.

18. The method of claim 14, further comprising:

detecting a latency of accessing the mailbox by the user via the computer network;
determining whether the detected latency exceeds a latency threshold; and
in response to determining that the detected latency exceeds the threshold, disallowing caching of any additional availability data representing additional availability information of the other users received at the mailbox via the computer network even if the determined amount of cached availability data does not exceed the preset threshold.

19. The method of claim 14, further comprising when the determined amount of cached availability data exceeds the preset threshold, relaying, by the additional mailbox servers via the computer network, a copy of the message to further mailbox servers hosting mailboxes corresponding to further users not in the meeting with the user.

20. The method of claim 14, when the monitored mailbox size exceeds the preset threshold, restricting a subset of the other users whose availability data is cached at the mailbox server.

* * * * *